May 5, 1970     A. J. PETROS ET AL     3,510,045

APPARATUS FOR JOINING STRIP MATERIAL

Filed July 17, 1967     11 Sheets-Sheet 1

INVENTORS
Andrew J. Petros &
Clement S. Rybar.
BY

THEIR ATTORNEYS

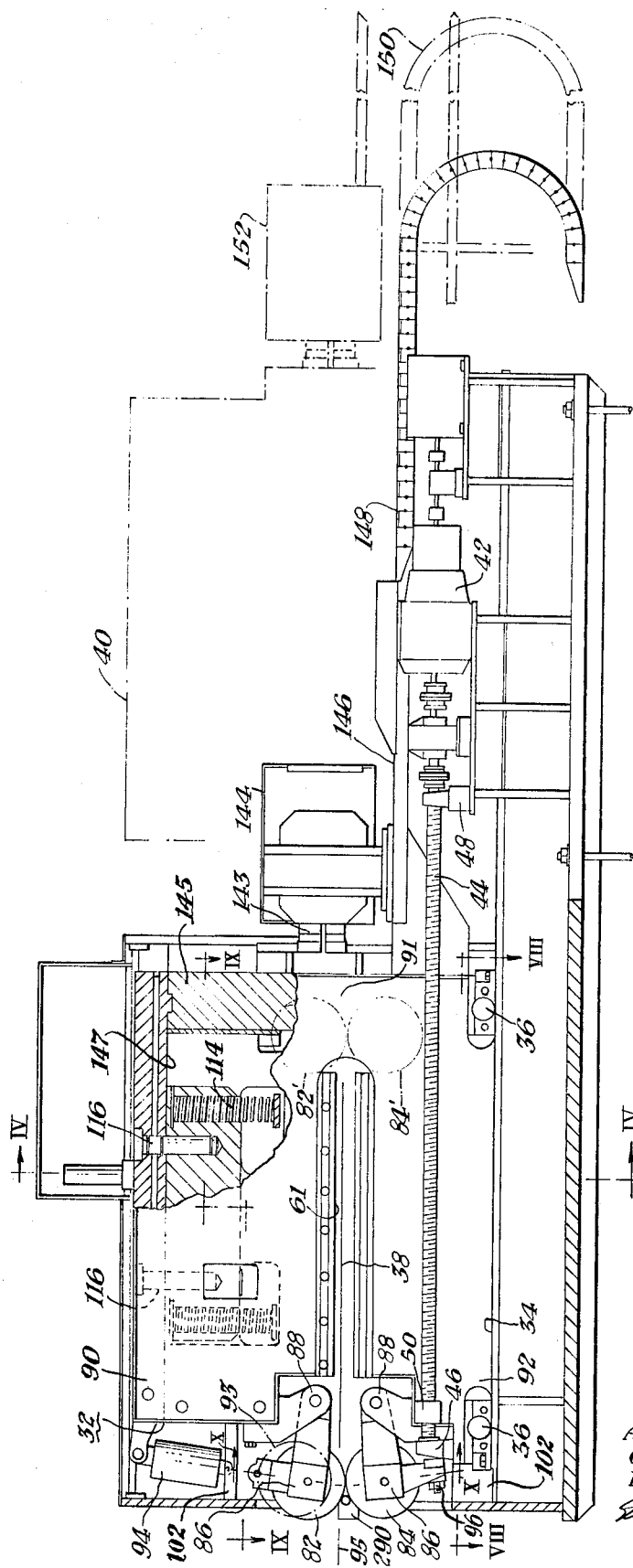

INVENTORS
Andrew J. Petros &
Clement S. Rybar
BY
THEIR ATTORNEYS

INVENTORS
Andrew J. Petros &
Clement S. Rybar.
THEIR ATTORNEYS

INVENTORS
Andrew J. Petros &
Clement S. Rybar.
BY

THEIR ATTORNEYS

United States Patent Office 3,510,045
Patented May 5, 1970

3,510,045
APPARATUS FOR JOINING STRIP MATERIAL
Andrew J. Petros and Clement S. Rybar, Pittsburgh, Pa., assignors to Mesta Machine Company, Pittsburgh, Pa.
Filed July 17, 1967, Ser. No. 653,940
Int. Cl. B23k 1/20
U.S. Cl. 228—5  14 Claims

ABSTRACT OF THE DISCLOSURE

A welding machine is disclosed for use with a strip mill or the like wherein a double shearing arrangement together with welding wheels is mounted on a traversing carriage forming part of the machine, for traversing movement with the carriage. The double shear arrangement includes a pair of entry shear blocks one of which is movable relative to the other, stationary block, and a similar pair of delivery shear blocks. The machine includes a pair of clamp mechanisms each of which is tiltable to an associated pair of the shear blocks to juxtapose a strip and held thereby to the stationary one of the associated shear blocks. Each of the clamp mechanisms are closed by means of an air cylinder or equivalent operating through a toggle mechanism. Means are provided for laterally shifting the shafts about which the clamp mechanisms respectievly are tiltable to move the clamp mechanisms toward and away from a strip access slot in the carriage and thereby to control the amount of overlap of the strip ends to be welded. The amount of overlap contributed by each clamp mechanism can be adjusted independently of the other clamp mechanism and indicator means are provided for indicating the lateral displacement of each clamp mechanism and the amount of overlappage of the strip clamped therein. Co-operating alignment means are mounted on the machine casing and on the traversing carriage for aligning the traversing carriage laterally of the machine each time the carriage is inserted into the casing. Welding wheel cleaning means are mounted on the machine casing for dressing the welding wheels each time the carriage is inserted into the casing. An air motor is associated with each welding wheel to commence rotation of the welding wheels before they engage the juxtaposed strip ends for welding the same.

---

The present invention relates to the joining of juxtaposed ends of strip material to form a continuous strip length, and more particularly to improved methods and apparatus for effecting such joining with a minimum of overlap in the strip ends.

Strip mills and other strip processing lines usually require the strip passing therethrough to be of continuous unbroken length. This is highly desirable because of the difficulty and time involved in threading the strip through the mill or line. In many such processing lines, the desired processing can only take place when the strip is running therethrough at a predetermined high rate of speed. Thus, the leading strip end which must be slowly threaded through the line cannot be properly processed and is usually wasted. For these reasons, threading of strip through the processing line is avoided whenever possible.

Strip materials cannot of course be produced in indefinite lengths but are only available in coils whose size is limited by manufacturing, handling and shipping considerations. A coil of such material is commonly fed into the strip mill and before it is entirely run out, the leading end of a subsequent coil is secured to the trailing end of the preceding strip coil. In this manner a continuous strip of material is maintained through the strip mill or the like and the laborious threading of strip through the line is largely avoided. Because of the tensional forces imparted to the strip at various stages of the rolling or other handling processes, it is essential that the juncture between the strip ends have at least the strength of the unbroken strip material. Owing to the speed and strength required in making the joint between the strip ends, welding the strip ends together presents the quickest and most efficacious joining process. In order to obtain consistently acceptable welds between the leading and trailing strip ends, it is usually desirable that these ends be lap-welded rather than butt-welded.

In the past many lap-welding machines and the like have been proposed for joining the aforementioned strip ends. For the most part such machines require that the strip ends be overlapped a considerable amount. Unfortunately, in previous machines this overlappage results in significantly increased thickness of the strip at the joint between the strip ends and in some cases the thickness is nearly doubled. This area of increased thickness is highly undesirable and renders the strip material difficult to process through the strip mill. The lapped joint usually must be sheared out of the strip before subsequent manufacturing operations upon the strip. All of such previously proposed apparatus, in addition to providing a joint of substantially increased thickness, presents the additional disadvantage of consuming too much production time to make each weld. Attempts have been made to reduce the amount of overlap at the junction between the strip ends, however, such means were not able to entirely eliminate the oversize thickness of the joint and moreover were too slow in operation, were unreliable and therefore could not produce consistently satisfactory weldments.

Welding machines have also been developed for butt welding and upsetting the joint betwen the strip ends. These machines are satisfactory for many applications but do not possess the requisite speed consistent with present day production rates.

We overcome these disadvantages of the prior art by providing a welding machine capable of quickly and efficaciously joining the leading and trailing ends of strip material. Our machine is capable of producing a joint between strip ends of essentially the same thickness of the strip material. To accomplish this, our machine is provided with novel means for accurately shearing and overlapping the strip ends to only a very slight extent. The accuracy of our machine in determining such overlap is such that a very nominal overlap between the strip ends will ensure overlappage entirely along the joint to the weld. Insofar as we are aware, there is no previously proposed machine capable of providing overlappage with such accuracy. Our machine is also provided with novel means for quickly effecting a weld between the strip ends and at the same time restoring the resulting welded joint to the initial thickness of the strip ends. The joints made by our machine do not require the strip line to handle oversize joints passing therethrough. The production of the processing line is substantially increased because our novel welding apparatus is capable of shearing and welding the strip ends within a significantly shorter interval. Thus, the life of the strip handling equipment is increased, strip production is increased, and strip wastage is minimized.

We accomplsh these desirable results by providing a welding machine for strip processing lines and the like, said machine comprising a moveable carriage structure, means for mounting said carriage structure for movement along a path toward and away from the pass line of said processing line, means for moving said carriage along said path, shear means mounted on said carriage for movement therewith for shearing said strip, and welding means mounted on said carriage for welding juxtaposed ends of said strip when thus sheared.

Desirably, also entry and delivery clamp mechanisms are mounted on said machine adjacent said pass line and at either side of said path, each of said clamping mechanism including a pair of clamp members and means for actuating said clamp members to a closed position to clamp said strip therebetween, and means for tilting said clamp mechanisms to juxtapose the strip clamped therebetween to said shear means when said carriage is moved to juxtapose said shear means to said pass line.

Desirably, also, each of said clamping mechanisms are mounted for movement toward and away from the area generally in the direction of said pass line and means are provided for so moving each of said clamping mechanisms independently of the other to overlap said juxtaposed ends.

Desirably, also, said shear means includes a pair of moveable shear blocks mounted on either side of a strip access slot in said carriage, said moveable shear blocks being moveable toward and away from positions of shearing juxtaposition with a pair of stationary shear blocks respectively likewise mounted on either side of said strip access slot.

Desirably, also, said entry clamp mechanism is titltable to a position whereat the strip end clamped therebetween is juxtaposed to one of said stationary shear blocks for shearing by the associated moveable shearing block, and said delivery clamp mechanism is tiltable to a position whereat a strip end clamped therebetween is juxtaposed to the other of said stationary shear block for shearing by the other of said moveable shear blocks.

Desirably, also, said clamp moving means are adjustable independently to vary the amount of overlappage contributed by each clamping mechanism and indicating means are provided for indicating each such overlappage.

During the foregoing discussion, various objects, features and advantages of the invention have been alluded to. These and other features and advantages together with structural details thereof will be elaborated upon during the forthcoming description of presently preferred embodiments of the invention and presently preferred methods of practicing the same.

In the accompanying drawings we have shown presently preferred embodiments of the invention and have illustrated certain presently preferred methods of practicing the same, wherein:

FIG. 2 is a longitudinally sectional view of the apparatus as shown in FIG. 1;

Figure 1:
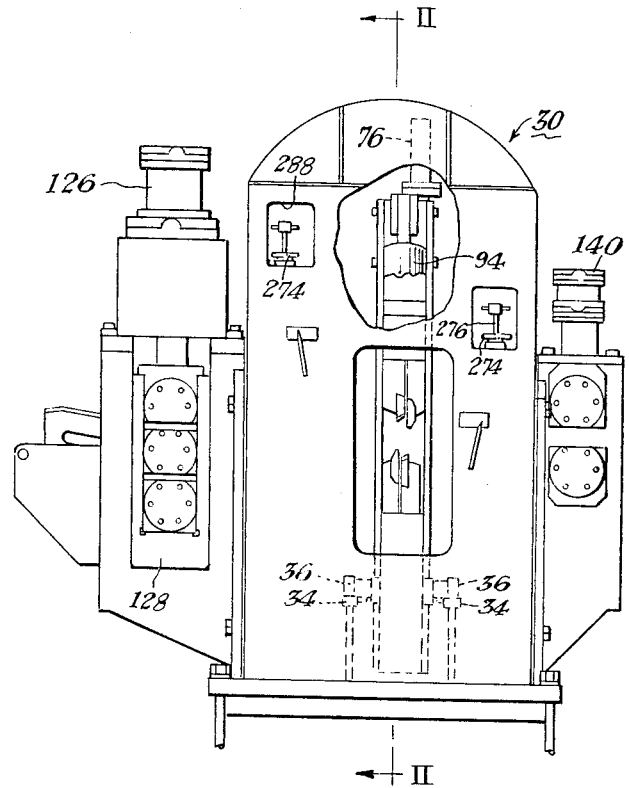
FIG. 1 is a front elevational view, with parts broken away, of one form of strip welding machine arranged in accordance with our invention.
Figure 8:
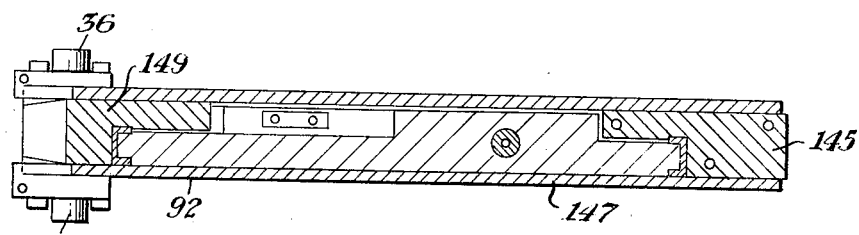
FIG. 8 is a partial, horizontally sectioned view of the apparatus as shown in FIG. 2 and taken along reference line VIII—VIII thereof.
Figure 9:
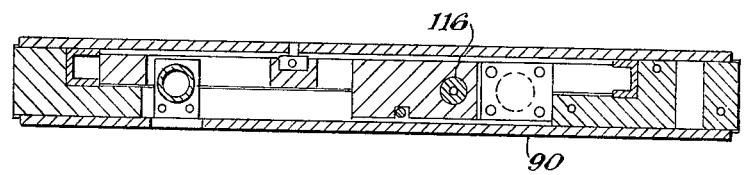
FIG. 9 is a similar view taken along reference line IX—IX of FIG. 2.
Figure 3:
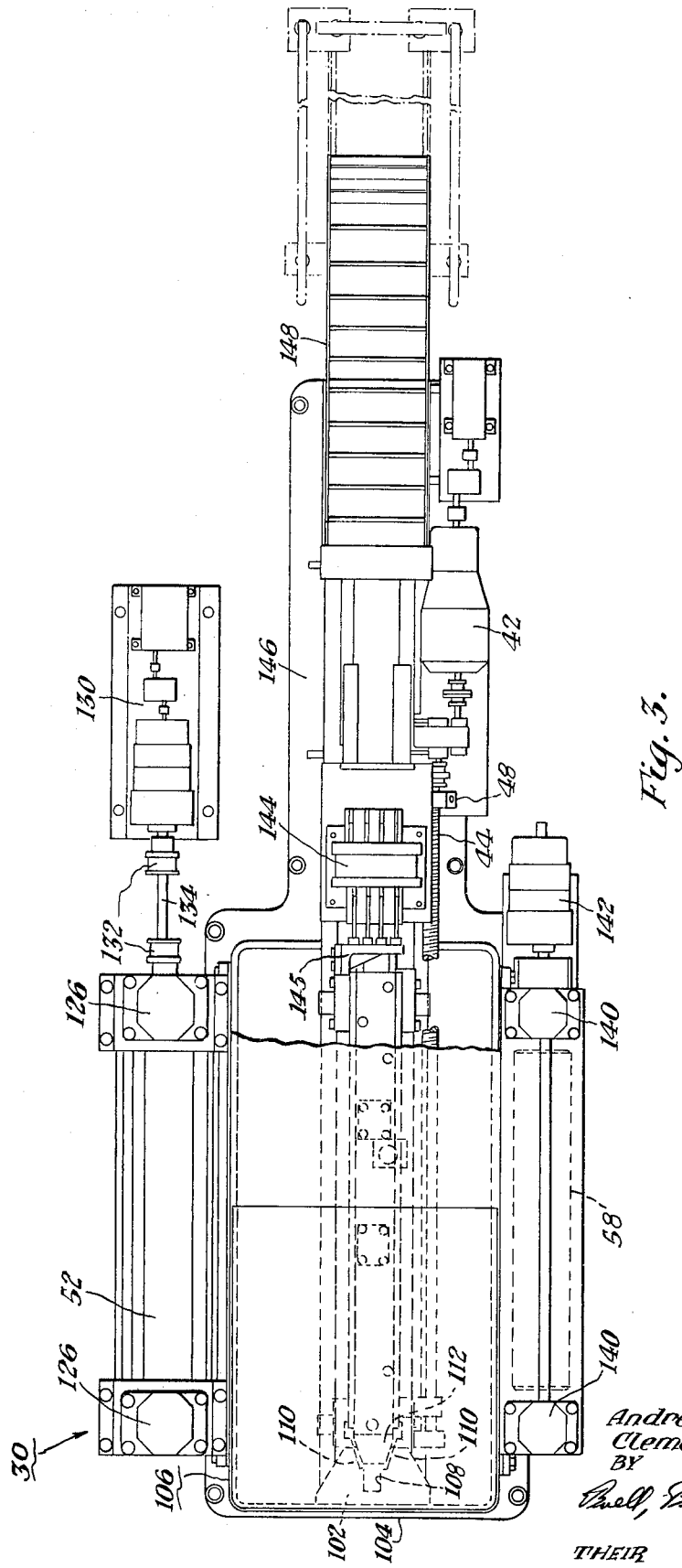
FIG. 3 is a top plan view of the apparatus as shown in FIG. 1.
Figure 4:
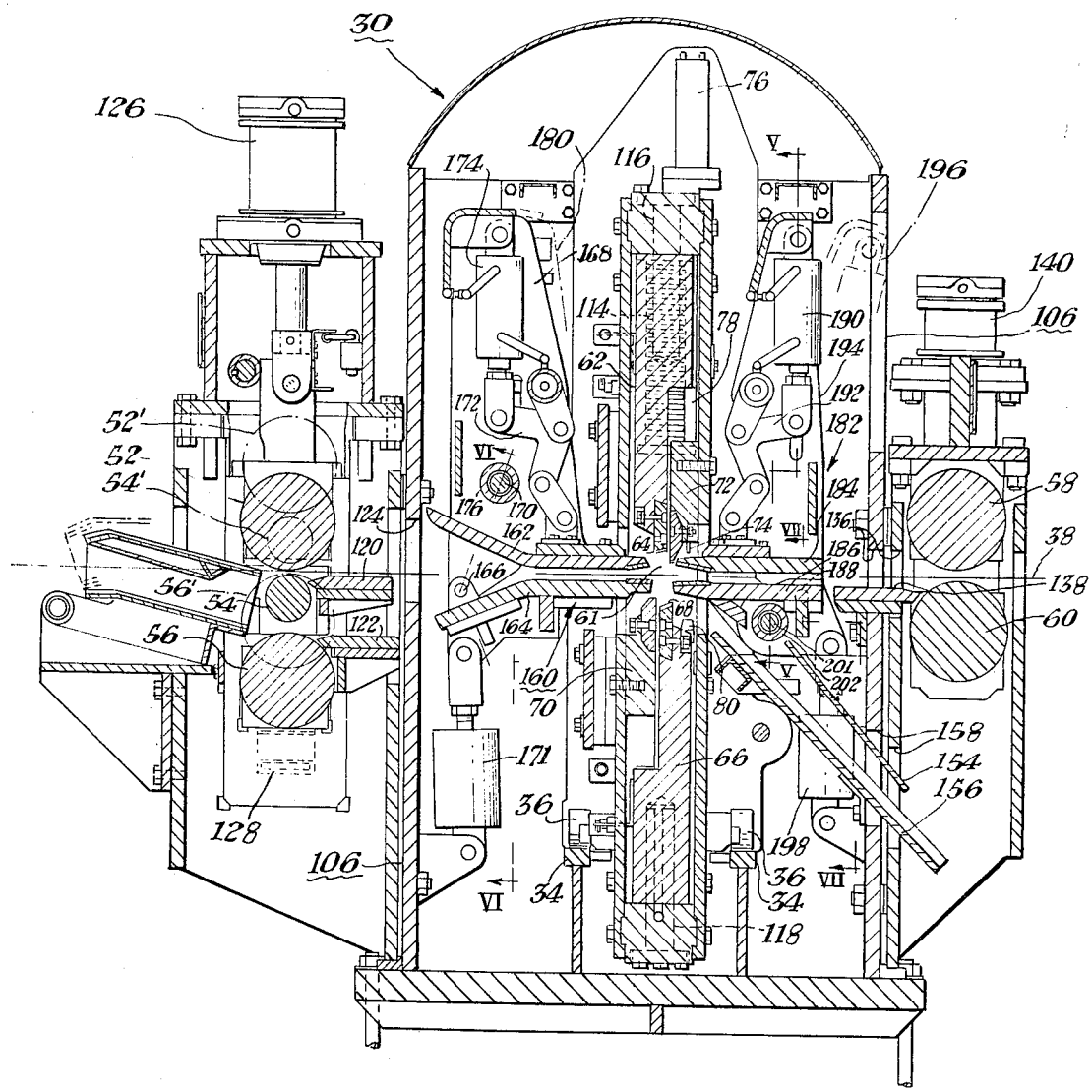
FIG. 4 is an enlarged vertically sectioned view of the apparatus as shown in FIG. 2 and taken generally along reference line IV—IV thereof.

Referring now more particularly to FIGS. 1–9 of the drawings, the illustrative form of the invention shown therein comprises welding apparatus 30 having a slide carriage 32 mounted on tracks 34 by means of rollers 36, as better shown in FIGS. 2 and 4. It will be seen that in FIG. 2, carriage 32 can be moved transversely of strip 38 and completely clear of the strip path, toward the rear of the welding maching 30 to chain outline position 40 of carriage 32. Suitable drive means, for example, motor and gear unit 42, are provided for rotating lead screw 44 rotatably mounted on front and rear bearings 46, 48 and threadedly engaging threaded lug 50 secured to the carriage 32.

As better shown in FIGS. 3 and 4 the movable carriage 32 thus can be inserted and withdrawn relative to the moving strip 38 whose path is defined by delivery rolls 58 and 60 and by entry rolls 52, 54 and 56, of which center roll 54 is powered for purposes described hereinafter. In furtherance of this purpose carriage 32 is bifurcated to define strip pass slot 61 therein.

The traversing carriage 32 is provided with an entry or down shear block 62 having blade 64 and a delivery or up shear block 66 having blade 68. Blades 64, 68 cooperate respectively with entry and delivery stationary shear blocks denoted generally by reference characters 70 and 72. As better shown in FIG. 4 upper or delivery stationary shear block 72 is provided with a weld identification punch 74 for making an ID hole on the delivery side of the weld. A similar punch 336 (FIGS. 17–22) extends through lower stationary shear block 70 for making simultaneously with shearing, an ID hole on the entry side of the weld. Punching on the delivery side is effected immediately after the shearing movement hereinafter by means of a short stroke hydraulic cylinder 76 to the distal end of whose piston rod 78 punch 74 is connected. When the up shear 68 is moved upwardly to shear the strip against stationary block 72 cylinder 76 is actuated to drive punch 74 through the strip and against punch stop 80.

Also mounted on the traversing carriage 32 are upper and lower welding wheels 82 and 84 fabricated from a suitable electrical conductor such as cast copper or copper alloy. In this arrangement wheels 82, 84 are mounted on frames 86 which are pivoted to brackets 88 mounted respectively on upper and lower legs 90 and 92 of the traverse carriage 32. At least one of the welding wheels, for example, upper welding wheel 82, can be raised and lowered relative to the lower wheel 84 by means of pneumatic cylinder 94. On the other hand the bottom, relatively stationary welding wheel 84 is provided with screw adjustment means 96, as better shown in FIG. 20 of the drawings, for adjusting its relatively stationary position relative to strip 38.

With this arrangement it will be seen that both the welding wheels 82, 84 and the shearing arrangement for the strip 38 are mounted on the movable carriage 32. This arrangement has the important and essential advantage of assuring a precisely parallel disposition of the weld made by the weld wheels 82, 84 with the sheared off head and tail ends 98 and 100 (FIG. 20) to be joined. With this arrangement the strip ends 98, 100 can be joined with a minimum of overlap for example in the order of 1/32 inch in contrast to the nominal 1/4 inch overlap required by conventional welding machines. The use of the double shear arrangement mentioned above contributes unexpectedly to this high degree of accuracy in that the amount of precision overlap is maintained constant along the entire length of the junction to be welded. As set forth hereinafter, however, the amount of desired overlap can be adjusted as desired for differing thicknesses of strip material, in accordance with another novel feature of our welding machine.

In order to ensure the proper transverse alignment of carriage 32 relative to tracks 34 and to the pass line of strip 38, alignment blocks 102 are mounted on front panel 104 of machine casing 106, as better shown in FIGS. 2 and 3 of the drawings. In furtherance of this purpose each block 102 is provided with groove 108 having outwardly flaring side walls 110 which co-operate with a wedge shape projection 112 mounted on the leading end of upper carriage leg 90. Thus, each time carriage 32 is returned to its shearing position, in juxtaposition to the strip pass line as shown in the solid outline of FIGS. 2 and 3, the carriage 32 is aligned with the balance of the welding machine 30 by bearing contact and aligning engagement between its wedge members 112 and alignment slot walls 110 of blocks 102.

To permit transverse movement of the carriage 32 relative to strip 38 and insertion of strip 38 into carriage 32, the carriage is of bifurcate or generally U-shape configuration as better shown in FIG. 2 as noted previously. Thus, legs 90 and 92 are spaced sufficiently to permit insertion of strip 38 therebetween. Legs 90, 92 are supported by reinforced bight portion 91. When the carriage 32 is being moved along its tracks 34 upper weld wheel 82 is generally withdrawn to its chain outline position 93 by its actuating cylinder 94. On the other hand lower weld wheel 84 normally is mounted at a stationary position slightly below pass line 95. Thus, when the carriage 32 is returned to its solid outline position in FIG. 2 welding wheels 82, 84 clear the strip 38. On the otherhand, when the carriage 32 is moved rearwardly of the welding machine 30 and the welding wheels 82, 84 contact the overlapping strip ends 98, 100 to effect a weld along a weld path defined by the overlapped strip ends, the strip ends are depressed slightly below pass line 95. This prevents the strip from contacting the lower jaws 164, 186 (FIG. 4) of the tiltable clamps 160, 182 described below when they are tilted to their upright positions. In the latter positions the upper surfaces of the lower jaws 164, 186 define weld line 101, which is the lowest position of these jaw surfaces.

The upper or entry shear block 62 is biased to its inactive position, as shown in FIGS. 2 and 4, by means of a pair of compressed coil springs 114. Shearing movements of the entry shear block 62 are effected by a pair of hydraulic cylinders 116 capable of driving the upper shear block 62 downwardly against the biasing force of coil springs 114 to shear strip 38 against the stationary entry block 70. On the other hand, the lower or delivery movable shear block 66 is withdrawn by gravity to its inactive position as shown in FIG. 4. The movable delivery shear block 66 is driven upwardly against strip tail end 98 and stationary delivery shear block 72 by a pair of cylinders 118 (FIGS. 2 and 4).

As better shown in FIG. 4, our novel welding machine 30 is provided with upper and lower entry tables 120, 122 disposed generally between entry pinch rolls 52-56 shown in FIG. 3 the entire ensemble of pinch rolls 52-56 and entry aprons 120-122 are raised and lowered by lifting cylinders 126 to align either the upper pair of pinch rolls 52-54 and upper table 120 with strip entry slot 124 as better shown in the solid outlines of FIG. 4 or to align the lower pair of pinch rolls 52-56 with the slot 124 as denoted by chain outlines 52', 54' and 56' of the entry rolls. A lower pair of cylinders 128 raises and lowers the middle entry roll 54 and lower entry roll 56 relative to the upper entry roll 52 for the purposes of either pinching a delivered strip between entry rolls 54, 52 or between the rolls 54, 56 as explained in greater detail with reference to FIGS. 19-25, inclusive. As better shown in FIG. 3 central entry roll 54 is driven by motor and gear unit 130 through universal couplings 132 and spindle 134 in the conventional manner.

Delivery rolls 58, 60 are mounted adjacent delivery slot 136 in machine casing 106 and delivery apron 138. Roll 58 is moved toward and away from roll 60 by a pair of actuating cylinders 140 as better shown in FIGS. 3 and 4 to pinch strip 38 therebetween when desired. Lower delivery roll 60, for example, is powered by motor and gear unit 142.

In order to supply a suitable welding current to the welding wheels 82, 84 as the wheels and traversing carriage 32 are moved across a junction to be welded in the strip 38, a suitable welding transformer 144 is provided as better shown in FIGS. 2 and 3. In this example a welding transformer 144 is mounted upon a rearwardly extending platform 146 of the carriage 32 and thus is movable with the carriage. Power leads to the transformer 144 and to the various cylinders mounted on the carriage 32 are mounted on a flexible track 148 therefore capable of movement as denoted by the solid outlines thereof in FIG. 2 and chain outline 150. A suitable, flexible track is sold under the trade name "Powertrak" by Gleason Reel, Mayville, Wis. The flexible track 148 permits withdrawal of the transverse carriage 32 and the welding transformer 144 to chain outline positions 140 and 152 thereof respectively without dragging or entangling of the various electrical, hydraulic, or other power leads.

Transformer secondaries 143 are each connected through conductive members (not shown) to the mounting brackets 88 and wheel frames 86. These components desirably are fabricated from a high conductivity cast copper alloy to provide a low resistance path through the aforementioned secondary path components including the wheels 82, 84.

Our welding machine 30 is provided with a dump chute formed for example by inclined plates 154 and 156 to eliminate sheared off leading strip ends from the welding machine 30 through dump slot 158 in casing 106.

Figure 6:
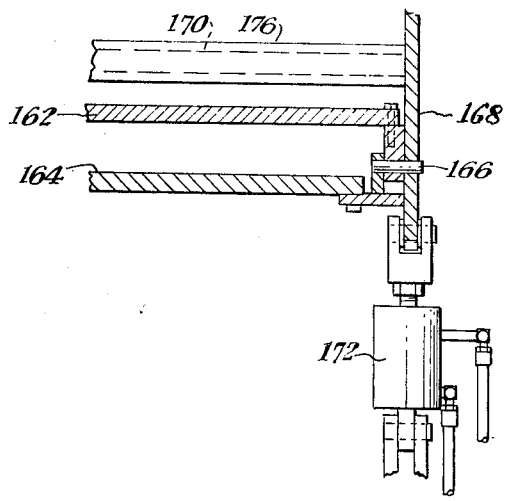
FIG. 6 is another partial, vertically sectioned view taken along reference line VI—VI of FIG. 4.

An entry clamp mechanism, denoted by reference character 160, is mounted within machine casing 106 between entry slot 124 and carriage slot 61 and is thus juxtaposed to the entry shear structure 62, 70. The entry clamp 160 includes upper and lower clamp members 162, 164 with the upper clamp member 162 being pivotally mounted on the lower clamp member 164 as denoted by reference character 166 and as better shown in FIGS. 4 and 6 of the drawings. The lower clamp member 164 on the other hand is rigidly mounted on tiltable support 168 which is angularly displaceable about the shaft 170 by means of pneumatic cylinder 171 (FIGS. 4 and 6). Upper clamp member 162 is pivoted about pivot 166 to close the clamping members 162, 164 with extremely high clamping force by means of toggle mechanisms denoted generally at 172 and actuated by pneumatic cylinders such as cylinder 174. As described hereinafter in greater detail the extent of overlappage contributed by delivery clamp 160 is controlled by eccentric portions 258 (FIG. 14) formed on tubular shaft 176.

Figure 20:
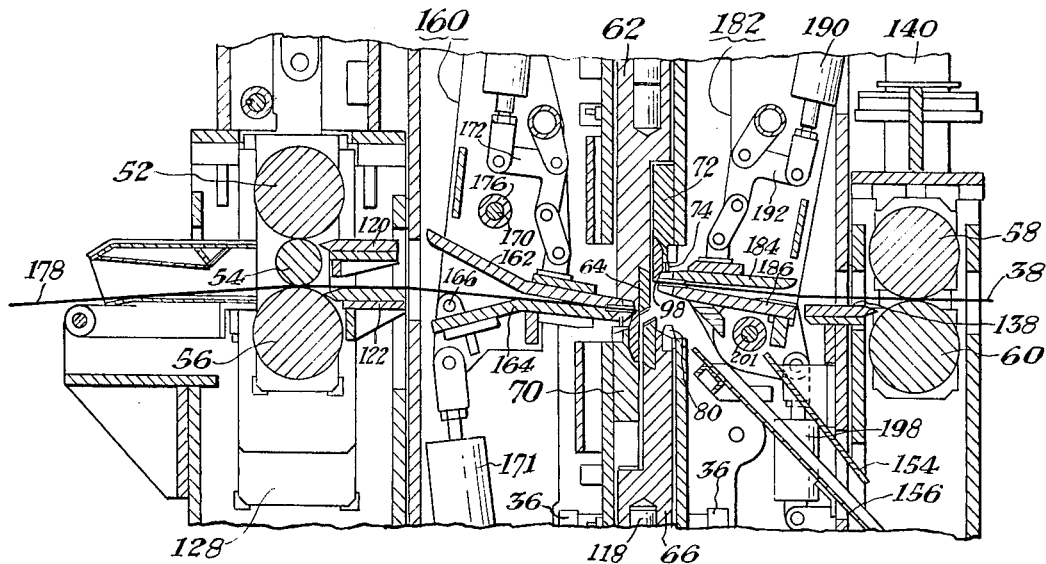
Figure 21:
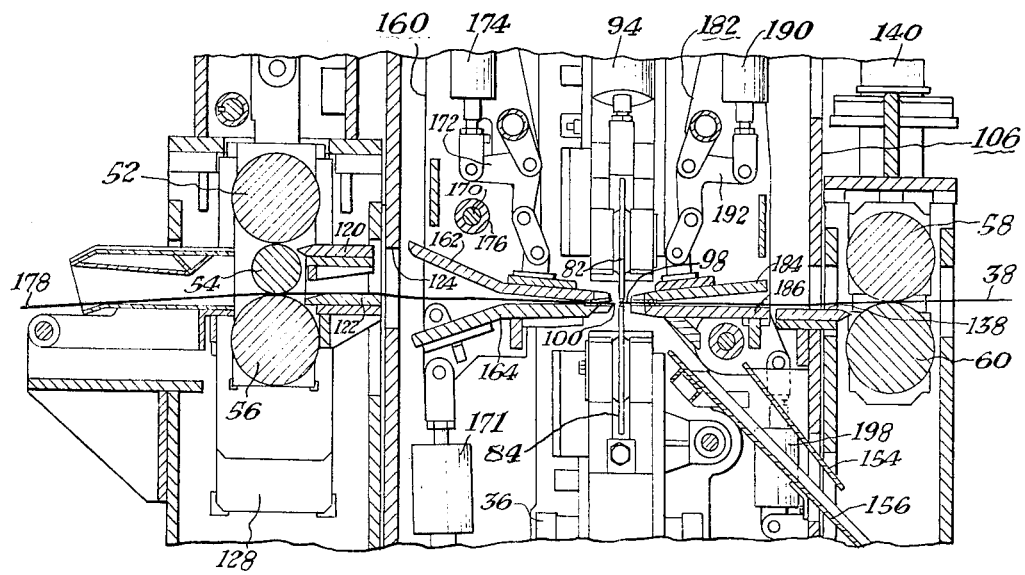

When the clamp cylinder 174 is actuated clamp members 162, 164 are moved together to clamp entry strip 178 therebetween as better shown in FIGS. 20 and 21. On the other hand when tilt cylinder 171 is actuated entry clamp 160 is tilted downwardly to the shearing position of strip 178 (FIG. 20) as denoted by chain outline 180 of tiltable support 168 in FIG. 4 of the drawings.

Figure 7:
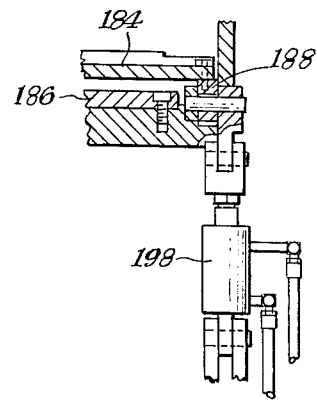
FIG. 7 is another partial, vertically sectioned view taken along reference line VII—VII of FIG. 4.

A generally similar, delivery clamp mechanism 182 is likewise pivotally mounted within our welding machine 30 but juxtaposed between delivery shears 68, 72 and delivery table 138 as shown in FIG. 4. Delivery clamp 182 includes upper and lower clamp members 184, 186 with the upper clamp 184 being pivotally mounted on the lower clamp 186 as denoted by reference character 188 and as better shown in FIG. 7 of the drawings. Upper delivery clamp member 184 is moved downwardly by a pair of pneumatic cylinders 190 and toggle mechanisms 192 to engage the strip under extremely high clamping forces, as better shown in FIG. 5. On the other hand a tiltable support including upright plates 194 (FIG. 5) and associated components are tilted between solid outlines position thereof and chain outline position 196 (FIG. 4) by a cylinder 198 (FIG. 7).

Figure 18:
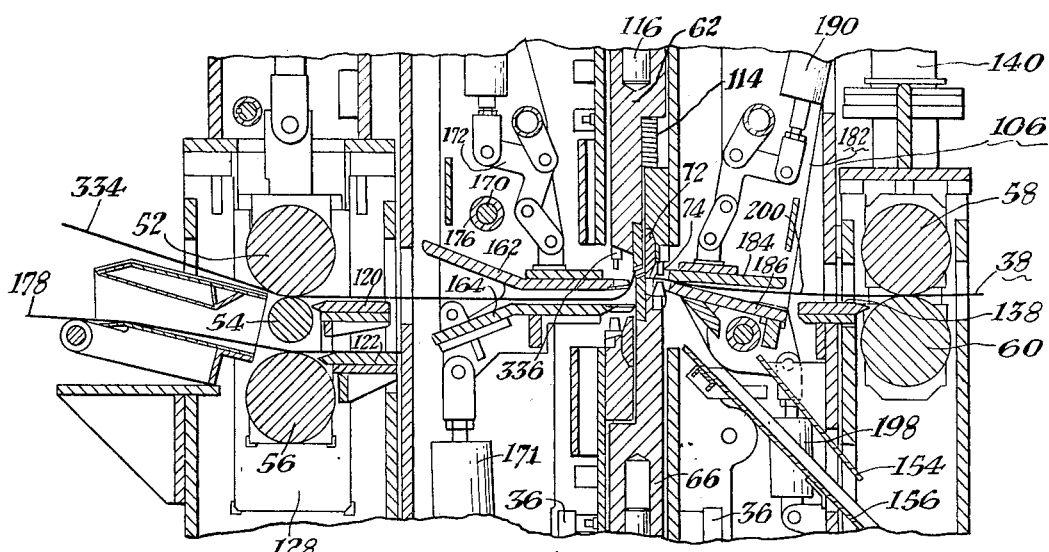

Thus, as better shown in FIGS. 18–21 clamp cylinders 190 are actuated to clamp delivery strip 200 therebetween, while tilt cylinder 198 tilt (FIGS. 18–20) delivery clamp 182 to permit the trailing end of delivery strip 200 to be sheared by delivery shear 68, 72 as better shown in FIG. 18.

The amount of overlappage contributed to the junction between the strip ends 98, 100 (FIG. 21) is controlled by an inner and outer shaft 201, 202 similar to the aforedescribed inner and outer shafts 170, 176 of the entry clamp 160, in the manner described below in greater detail.

Figure 10:
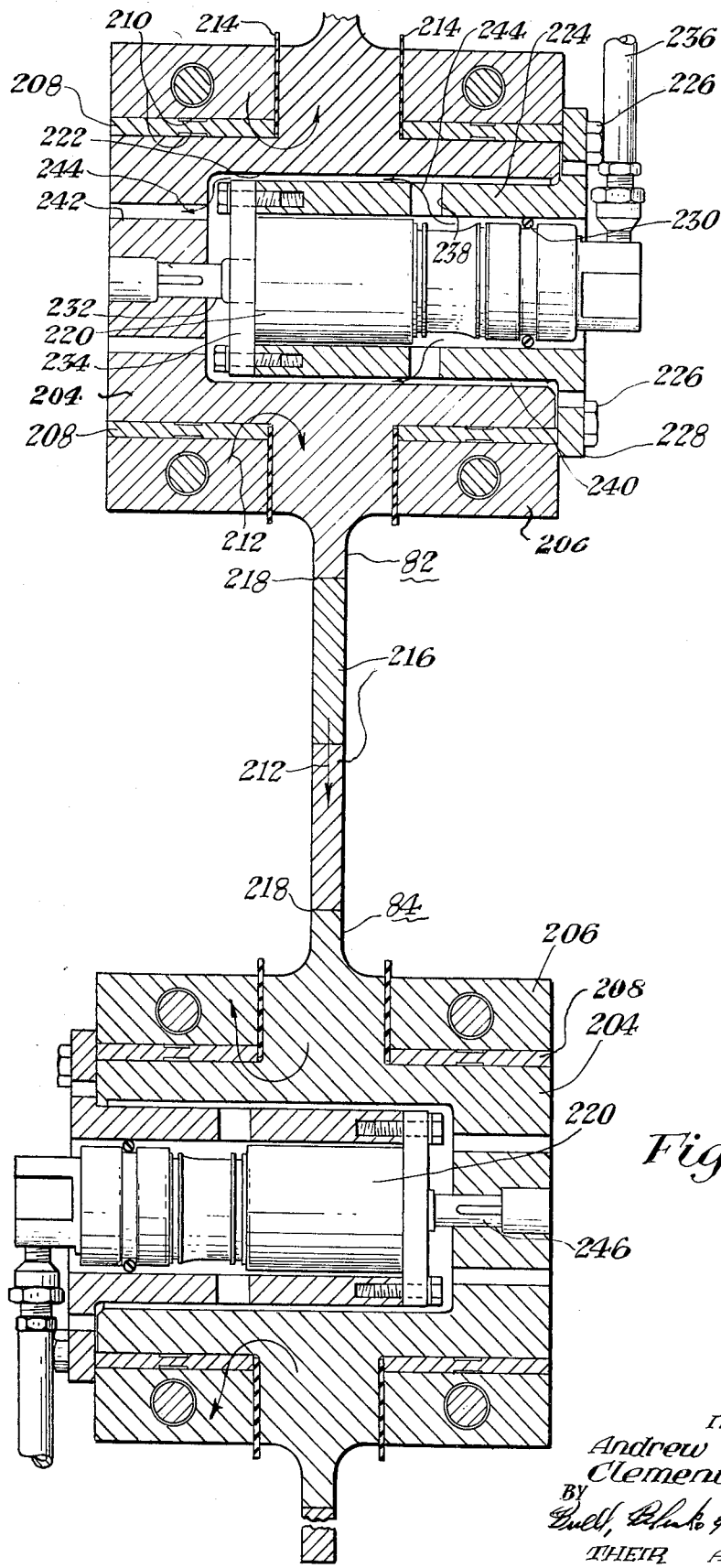
FIG. 10 is a partial, generally vertically sectional view of the apparatus as shown in FIG. 2 and taken along reference line X—X thereof.

As better shown in FIG. 10 each of the welding wheels 82 or 84 is provided with a hub 204 whereby the welding wheel is mounted in a pair of dead eyes 206 bolted on its pivoted mounting frame 86. A conductive lubricational bushing 208 is mounted on each side of each wheel 82 or 84 and is provided with lubricating passages 210. During welding, the flow of welding current, for example, is in the direction of arrows 212 and in this example passes entirely through the four bushings 208.

In many applications it is desirable to pass current in this fashion through rotating surfaces in bearing contact, i.e., through those portions of the dead eyes 206 which engage bushings 208 in turn bearingly engaging wheel hubs 204. Each wheel 82 and 84 is provided with a pair of insulating discs 214 in order to prevent the passage of welding current directly from the dead eyes 206 to the welding wheels 82, 84 where there is merely sliding rather than bearing contact between the stationary dead eyes 206 and the rotating wheels 82, 84.

To facilitate replacement of worn parts each of the welding wheels 82, 84 is provided with a removable rim portion 216 of washer or annular configuration which is shrunk-fitted onto the remainder of the welding wheels at the junctions denoted by reference characters 218. Accordingly, when the rim portions of the welding wheels 82, 84 are worn out these portions are readily replaced without necessitating replacement of the entire welding assembly.

In order to facilitate initial engagement of the welding wheels 82, 84 with lapped over strip ends 98, 100 without damage to the joint thus formed or to the welding wheels, the latter desirably are set into rotation before such engagement and before welding of the joint is commenced. Thus, means are provided for rotating the welding wheels 82, 84 at or before the traversing carriage 32 begins its movement toward the rear of our novel welding machine 30 (FIG. 2) so that the welding wheels are rotating when they first engage the adjacent end of the lap joint to be welded.

One arrangement for so rotating the wheels 82, 84 includes an air motor 220 mounted within hub recess 222 in each of the welding wheels 82, 84. In furtherance of this purpose each air motor 220 is mounted within a tubular bracket 224 bolted at 226 by means of its flange 228 to the associated relatively stationary dead eyes 206. Each air motor 220 is positioned within its associated tubular bracket 224 by means of O-rings 230 and output shaft 232 rotatably mounted in a suitable central aperture therefor in bracket end plate 234. Energizing air is supplied to each air motor 220 through conduit 236.

The air motors 220 are conventional in construction and in this example exhaust air therefrom passes outwardly through radial apertures 238 in the tubular bracket 224 through annular space 240 between the tubular bracket and the rotatable wheel hubs 204 where it exits through axial openings 242 in the other end of the wheel hubs 204 and through openings 243 in the other end of tubular bracket 224, as denoted by flow arrows 244. Thus, use of air motors 220 presents the additional advantage of cooling the welding wheel structures 82, 84 by means of the air motor exhaust passing along the path defined by flow arrows 244. Air motors 220 rotate the welding wheels 82, 84 when pressurized air is supplied thereto through conduits 236 by means of their output shafts 232 which are keyingly engaged with the substantially closed ends of wheel hubs 204 respectively.

Referring now to FIGS. 5, 11, 13–15 and 14A of the drawings, the means for moving each of the clamp mechanisms 160, 182 toward and away from the other (i.e., toward and away from carriage strip slot 61) and for thus controlling individually the overlappage contributed by one or both of the entry and delivery clamps 160, 182 respectively will now be described in greater detail. Inasmuch as the tubular shafts 176 and 202 and associated eccentric components are essentially identical, only the shaft 202 will be described in detail together with its relationship to the associated components of the delivery clamp 182.

Figure 5:
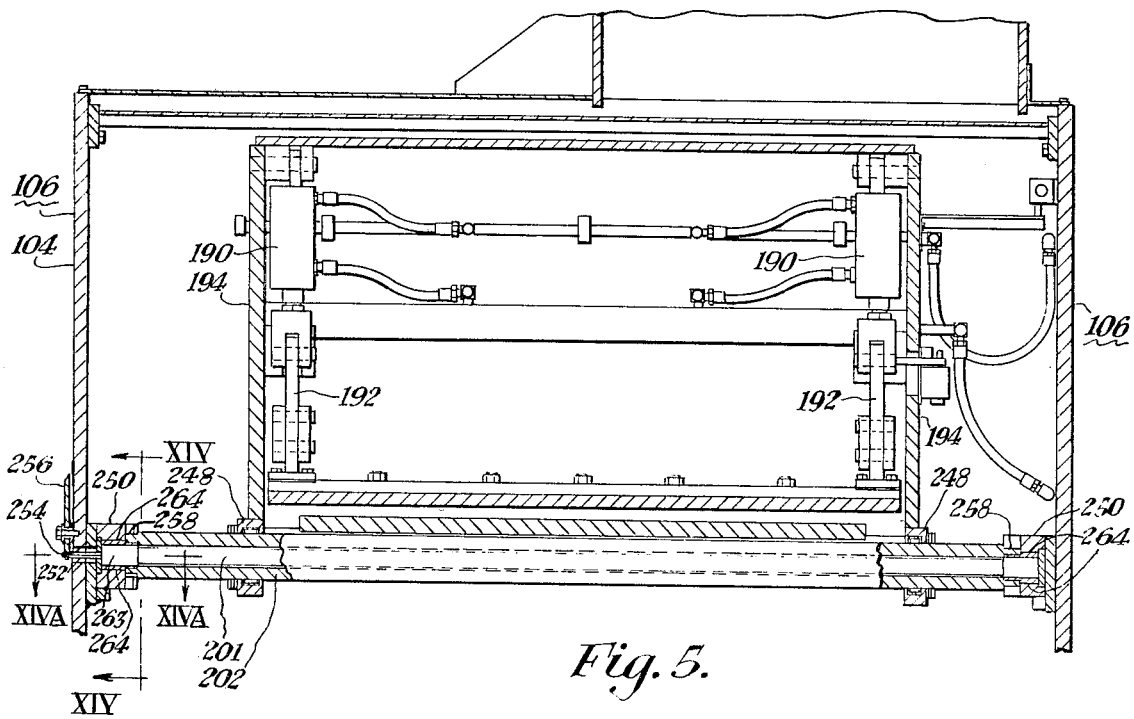
FIG. 5 is a partial, vertically sectioned view of the apparatus as shown in FIG. 4 and taken generally along reference line V—V thereof.

As better shown in FIG. 5 laterally moveable pivot shaft 201 and eccentric shaft 202 through which the pivot shaft is loosely inserted each extend through bearings 248 mounted in each vertical plate 194 of the associated tiltable clamp support. At each end of the shafts 201, 202, a bearing assembly 250 is provided which is mounted on the adjacent portion of the machine casing 106. At the front panel 104 of the casing an indicator actuator 252 (FIG. 14A) extends through panel aperture 254 for engagement with indicator or pointer 256. At each end of the tubular shaft 202 an eccentric surface 258 is provided which is engaged by vertical slide plates or liners 260 as better shown in FIG. 14 of the drawings. The vertical slide plates 260 thus permit the top surfaces of the tubular shaft eccentrics 258, as viewed in FIG. 14, to move only in a vertical direction as denoted by double headed arrow 262.

Figure 14:
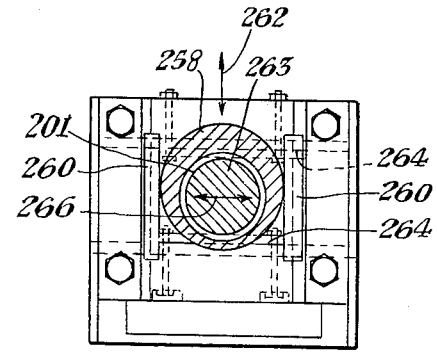
FIG. 14 is an enlarged, partial, vertically sectioned view of the apparatus as shown in FIG. 5 and taken along reference line XIV—XIV thereof.
Figure 14A:
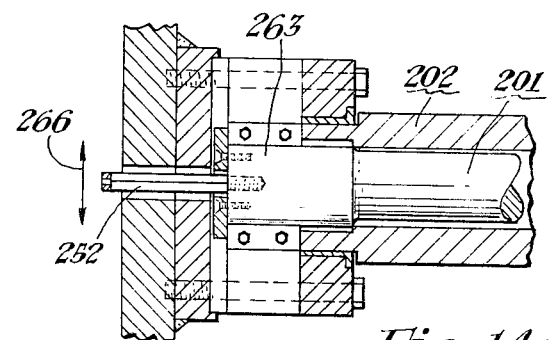
FIG. 14A is an enlarged, partial, horizontally sectioned view of the apparatus as shown in FIG. 5 and taken along reference line XIVA—XIVA thereof.

On the other hand each end 263 of the inner shaft 201 is confined between horizontal slide plates 264 (FIGS. 5 and 14) so that inner shaft 201 and the major proportion of the tubular shaft 202 (i.e., the portion extending between its eccentric ends 258) can only move in the horizontal direction as denoted by double headed arrow 266 in FIGS. 14 and 14A. Thus, the confinement of the tubular shaft eccentrics 258 to vertical movement and the inner shaft ends 263 only to horizontal movement (FIG. 14A) shifts the entire pivot support 201, 202 and the delivery clamp 182 to the right or left as viewed in FIG. 4 of the drawings in order to obtain the required amount of overlappage. In a similar manner the entry clamp 160 is shifted toward and away from the delivery clamp 182 by similar manipulation of its pivot shafts 170, 176.

Further in accordance with our invention, we provide means for controlling the amount to which one or both of the entry and delivery clamps 160, 182 are shifted toward or away from one another. This is accomplished by controlling the angular displacement imparted to eccentric shaft 202 by pneumatic cylinder 268 (FIGS. 11 and 13) coupled to arm 270 which is in turn secured to the tubular shaft 202 adjacent its front eccentric 258 as better shown in FIG. 13 of the drawings. Overlappage cylinder 268 is pivotally mounted on brackets 272 secured to the inner side of casing 106. The throw of the piston within cylinder 268 and hence the angular displacement of the arm 270 and horizontal displacement of shafts 201, 202 is controlled by manual adjustment handwheel 274 threadedly engaging piston rod 276. Adjustment wheel 274 is mounted adjacent access opening 278 in front panel 104 of casing 106. A highly precisioned adjustment is thus obtained for example where the throw of the cylinder piston relative to the horizontal overlapping movement is in the order of 16:1.

Figure 13:
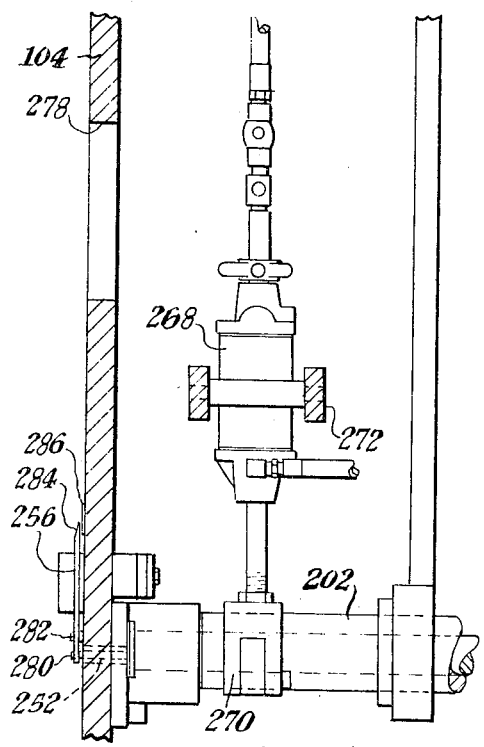
FIG. 13 is a partial, vertically sectioned view of the apparatus as shown in FIG. 11 and taken along reference line XIII—XIII thereof.

As better shown in FIGS. 5 and 13 inner shaft extention actuator 252 is pivotally secured to the lower end of indicator 256 as denoted by reference character 280. Indicator 256 in turn is pivoted at fulcrum 282 and the upper end 284 co-operates with a suitably calibrated scale 286 to indicate the overlappage contributed by the delivery clamp 182.

Figure 11:
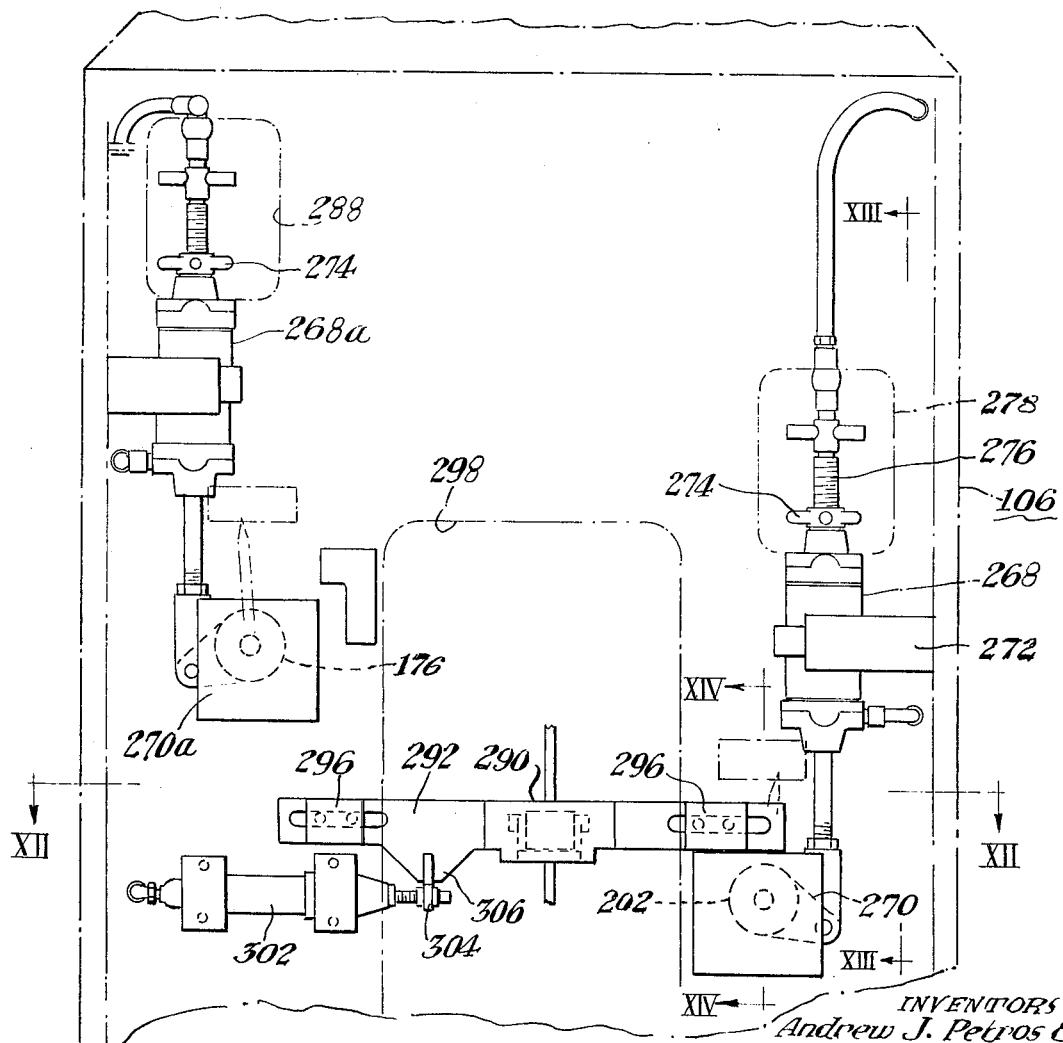
FIG. 11 is an enlarged, partial, front elevational view of the apparatus as shown in FIG. 1.

In a similar manner, as better shown in FIG. 11, entry clamp 160 can be displaced horizontally by means of cylinder 268a and arm 270a coupled to its tubular shaft 176. A similar indicator structure is coupled to the front end of inner shaft 170 of entry clamp 160 while its overlappage cylinder 268a is provided with a similar manual adjustment means accessible through front panel opening 288.

Figure 12:
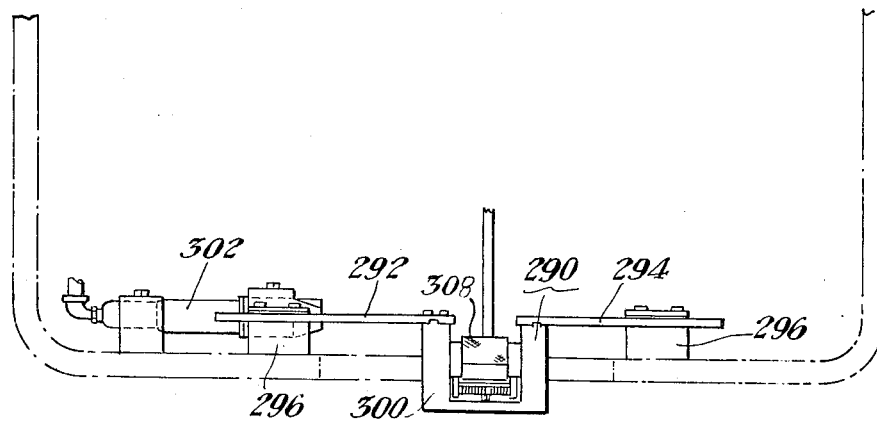
FIG. 12 is a cross-sectional view of the apparatus as shown in FIG. 11 and taken along reference line XII—XII thereof.

Referring now to FIGS. 11, 12, 15 and 16 we contemplate the provision of novel means for cleaning or dressing the welding wheels 82, 84 when carriage 32 is moved to its fully inserted position as denoted by the solid outlines thereof in FIG. 2. Thus, one form of such dressing means includes a reciprocating cleaning mechanism 290 mounted on brackets 292 and 294 which in turn are slidably mounted on bearing blocks 296 respectively. The bearing blocks 296, as better shown in FIGS. 11 and 12, are mounted on either side of the large access opening 298 in front panel 104.

The cleaning mechanism 290 includes a generally U-shaped housing 300 joined at its outer leg ends to the slide brackets 292, 294. The housing 300 and the slide brackets are reciprocated in this example by a suitable reciprocating air motor 302 mounted on the inner side of the front panel 104 and connected through arm 304 and bracket tab 306 to the adjacent slide bracket 292.

Figure 15:
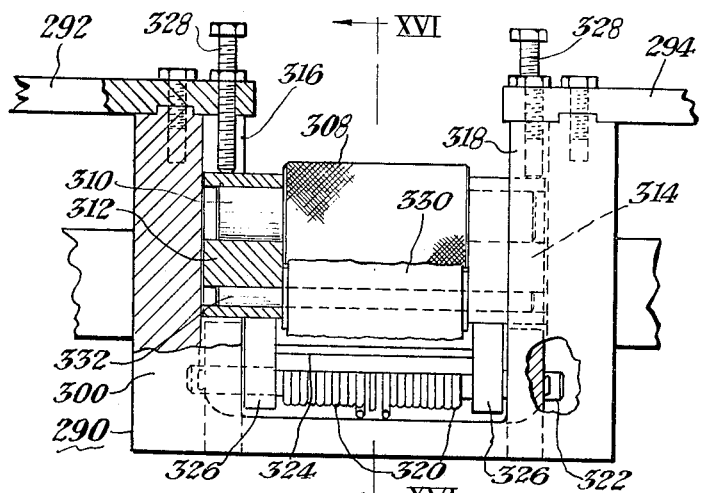
FIG. 15 is an enlarged, fragmentary, plan view of the welding wheel cleaning apparatus shown in FIG. 12 with portions thereof broken away.
Figure 16:
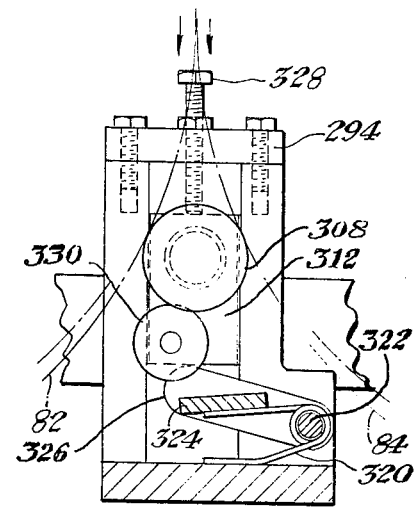
FIG. 16 is a vertically sectioned view of the apparatus as shown in FIG. 15 and taken along reference line XVI—XVI thereof.

As better shown in FIGS. 15 and 16 the cleaning mechanism 290 includes a knurled dressing roller 308 mounted on shaft 310 the ends of which are in turn rotatably mounted in slide blocks 312 and 314. Blocks 312, 314 are respectively and slidably engaged in channels 316 and 318 of the housing 300. Roller 308 as better shown in FIG. 16 is wedgingly insertable between the rims of the welding wheels 82, 84 and is urged to this position by a pair of biasing torsional springs 320 mounted on shaft 322 which is rotatably but stationary mounted on housing 300 as better shown in FIG. 15. The springs 320 engage connecting plate 324 extending between pivoted lugs 326 on shaft 322. The free ends of the lugs 326 engage slide blocks 312, 314 respectively to urge the knurled roller 308 carried thereby to dressing engagement with the welding wheels 82, 84, at the fully inserted position of traversing carriage 32 (FIG. 2). As better shown in FIG. 15 a screw adjustment 328 is provided for each of the slide blocks 312, 314 to limit inward movement thereof.

Desirably, the knurled or grinding roller 308 is cleaned by roller brush 330 or equivalent mounted on shaft 332, which is also rotatably mounted on slide blocks 312, 314 for movement therewith. The knurled roller 308 is cleaned by rotational engagement with roller brush 330 as the knurled roller 308 is reciprocated while engaging the rotating welding wheels 82, 84 which engagement may impart rotation to the knurled roller 308, as when the roller 308 is initially but momentarily engaged by one of the oppositely rotating welding wheels 82, 84. At this time, the welding wheels 82, 84 are rotated by their air motors 220 described above with reference to FIG. 10 of the drawings. The reciprocatory air motor 302 is a readily available, conventional item.

Figure 17:
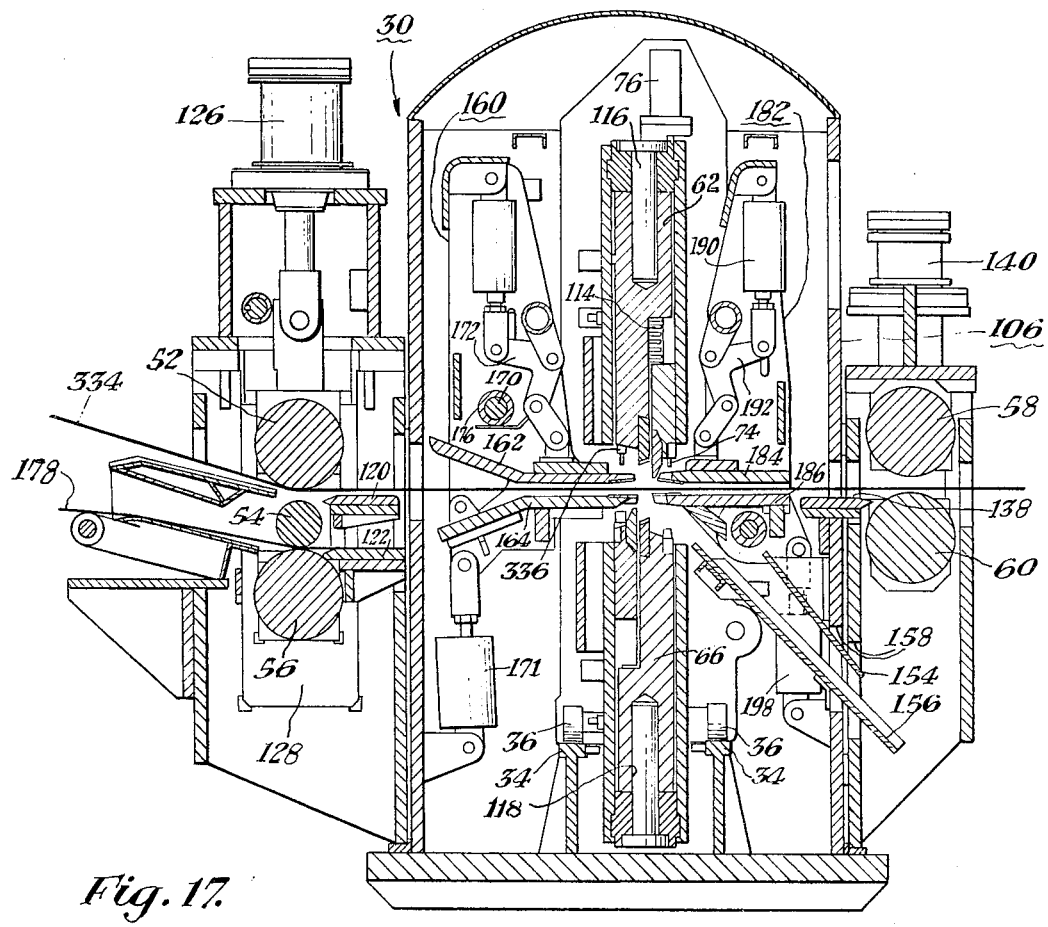
FIGS. 17 to 22 respectively are reduced, schematic views of our novel welding apparatus, similar to FIG. 4 with parts broken away and other parts removed, and illustrating respective steps in the operation of our apparatus.

In operation referring to FIGS. 2, 4 and 17–22, strip 38 is running through our welding machine 30 in the inactive position thereof from pay off reel (not shown) from which entry strip 334 is taken for passage between upper and middle entry rollers 52, 54. During this time entry and delivery clamps 160 and 182 are in their upright and unclamped positions as shown in FIG. 17 and their eccentric 258 desirably are placed in their maximum overlap positions by cylinders 268, 268a. The entry and delivery pinch rollers are open entry and delivery shear blocks 62, 68 are withdrawn, and entry punch 336 can be hydraulically locked in its extended position if an entry ID hole is required. A new strip end 178 from a full pay off reel (not shown) is placed in position for feeding between middle entry roll 54 and lower entry roll 56 (FIG. 17).

As the end of the exhausted strip 334 approaches the strip mill or other processing line is stopped, delivery rolls 58, 60 are pinched, and toggle cylinder 190 of delivery clamp 182 is actuated to clamp the strip between clamp members 184, 186. The delivery clamp 182 is then tilted to bring the tail end of this strip 334 into the shearing position as shown in FIG. 18. The delivery or up shear block 66 is actuated by cylinders 118 (FIG. 2) to shear the tail end of strip 38 against the upper stationary block 72. The strip 38 is sheared precisely parallel to the path of the welding wheels 82, 84 and traversing carriage 32. After the tail end is sheared delivery punch 74 is extended if a delivery ID hole is desired. The delivery or up shear block 66 is then retracted as is delivery punch 74.

Figure 19:
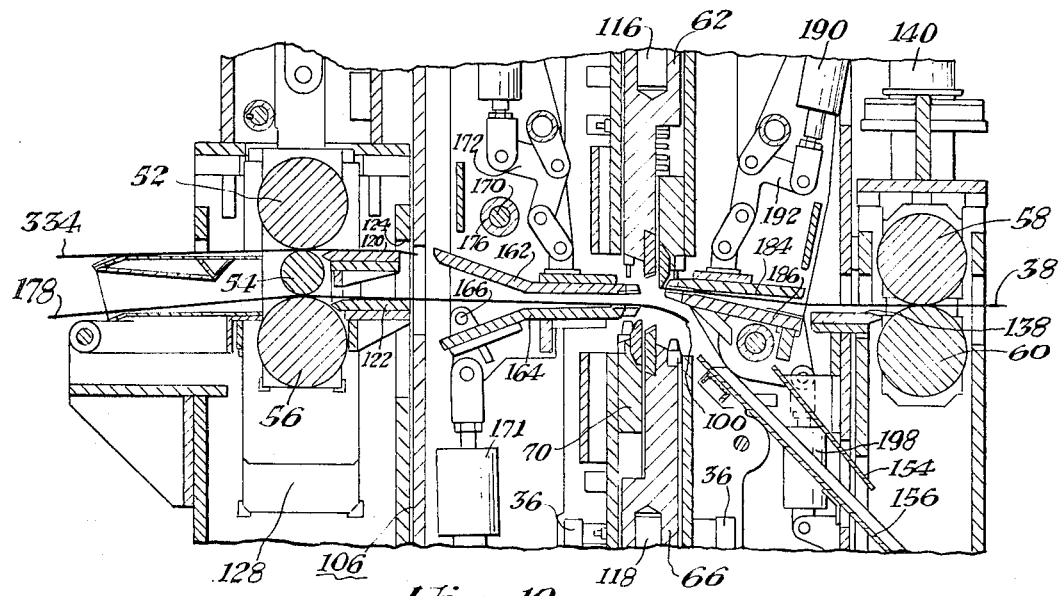

Following this operation and as shown in FIG. 19, entry roll cylinders 126 are actuated to raise entry rolls 52 56, the strips are pinched between entry rolls 52–56, and middle roll 54 is rotated to remove sheared off strip end 334 and to insert the leading end of the new strip 178. The new strip 178 is inserted until its leading end 100 extends beyond the entry or down shear 62 as shown in FIG. 19.

As shown in FIG. 20 the old strip end 334 is completely removed from the welding machine 30. Entry clamp 160 clamps the new strip end and is tilted down to the shearing position by cylinder 171. The leading end of the new strip is then sheared with the entry or down cut shear block 62 acting against the entry stationary shear block 70. This cut likewise is precisely parallel with the path of welding wheels 82, 84 and carriage 32. The entry punch 336 when used punches the strip simultaneously with the entry shearing operation, provided that punch 336 is locked in its extended position. During these operations as shown in FIG. 20 delivery clamp 182 remains in its clamped and tilted position.

Preparatory to welding the strip ends 98, 100 as shown in FIG. 21, the entry or down shear block 62 is retracted and the entry and delivery clamps 160, 182 are tilted back to the vertical positions to place the strip ends in a maximum overlap position, while clamping cylinders 174 and 190 and toggles 172, 192 maintain the respective clamping members thereof in their clamped positions. One or both of overlapping cylinders 268, 268a are then actuated to move one or both of the entry and delivery clamps 160, 182 away from the other to obtain a precision overlap. In the specific arrangement of the invention as shown, each of the clamps 160, 182 is capable of movement to produce 0 to 3/16 inch overlap, so that when one or both clamps are thus moved a total overlap of 0 to 3/8 inch can be effected. However, for a given thickness of strip 38 the amount of overlappage is established by adjusting one or both of the handwheels 274 and need not be thereafter adjusted until a different thicknes of strip is run through the strip mill.

Following this operation and also shown in FIG. 21 the upper welding wheel 82 is moved down by its cylinder 94 to its welding position. With the air motors 220 (FIG. 10) having been previously actuated, carriage 32 is then traversed to its chain outline position 40 (FIG. 2) by drive unit 42 to complete the weld.

Figure 22:
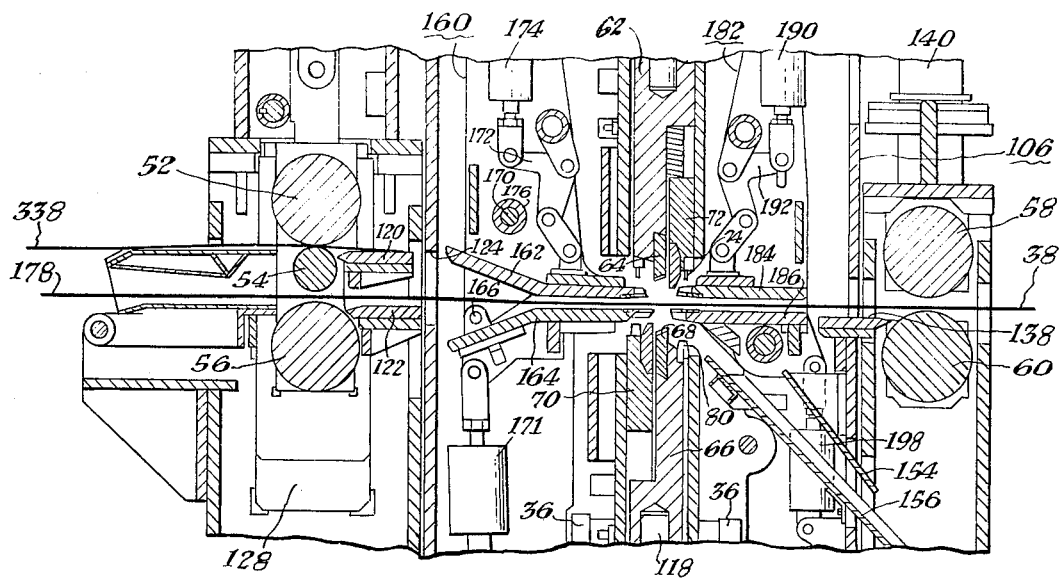

After the weld is made as better shown in FIG. 22 carriage 32 is returned to its solid outline position (FIG. 2). Entry and delivery clamps 160, 182, entry pinch rolls 52–56 and delivery pinch rolls 58, 60 are opened, and the strip line is restarted. When the transverse carriage 32 is returned to its solid outline position as shown in FIG. 2, the previously described cleaning device 290 is actuated to dress the welding wheels 82, 84. As the carriage 32 traverses forward across the path of the strip 38, the aforementioned components are returned to their original positions as shown in FIG. 17, with the exception that entry rolls 54, 56 and a new strip end 338 is inserted between the upper and middle entry rolls 52, 54.

After the pay off reel (not shown) on which running strip 178 is wound, is exhausted, the procedure illustrated in FIGS. 18–22 is repeated with the exception that the entry rolls are moved down instead of up to enter the waiting strip end 338 into entry slot 124 of machine casing 106.

It will be understood of course that conventional operating circuitry and associated components can be provided for effecting the aforedescribed operational sequence without the intervention of manual control other than manual adjustment of handwheels 274 to change the desired amount of overlap to meet changing productional conditions.

From the foregoing it will be apparent that novel and efficient forms and methods for joining strip metal have been disclosed herein. While we have shown and described presently preferred embodiments of the invention and have illustrated certain presently preferred methods of practicing the same, it is to be distinctly understood that the invention is not limited thereto but may be otherwise variously embodied and practiced within the scope of the following claims.

We claim:

1. A welding machine for a strip processing line and the like, said machine comprising a movable carriage structure, means for mounting said carriage structure for movement along a path toward and away from the pass line of said processing line, means for moving said carriage along said path, first and second shear means independently mounted on said carriage for movement therewith for shearing leading and trailing ends respectively of said strip, means for independently actuating said first and said second shear means, and welding means mounted on said carriage for welding juxtaposed ends of said strip when thus sheared.

2. The combination according to claim 1 wherein said carriage includes bifurcate leg portions spaced for insertion of said strip therebetween, and said welding means includes a pair of welding wheels rotatably mounted on said leg portions respectively.

3. The combination according to claim 1 wherein an alignment block is mounted on said machine adjacent one end of said path, and cooperating alignment means are mounted on said block and on said carriage, said alignment means being engageable when said carriage is positioned at said one path end to re-align said carriage precisely with said path.

4. The combination according to claim 2 wherein cleaning means are provided for dressing said welding wheels, said cleaning means being mounted adjacent one end of said path and juxtaposed for engagement by said wheels when said carriage is moved to a position at said one path end, said cleaning means including a roller having a grinding surface for contacting welding edges of said wheels and means for reciprocating said roller and for rotating said wheels in contact with said roller.

5. A welding machine for a strip processing line and the like, said machine comprising a movable carriage structure, means for mounting said carriage structure for movement along a path toward and away from the pass line of said processing line, means for moving said carriage along said path, double shear means mounted on said carriage for movement therewith for shearing leading and trailing ends respectively of said strip, welding means mounted on said carriage for welding juxtaposed ends of said strip when thus sheared, entry and delivery clamp mechanisms mounted on said machine adjacent said pass line and at either side of said path, each of said clamping mechanisms including a pair of clamp members and means for actuating said clamp members to a closed position to clamp said strip therebetween, and means for tilting said clamp mechanisms to juxtapose the strip clamped therebetween to said shear means, when said carriage is moved to juxtapose said shear means to said pass line.

6. The combination according to claim 5 wherein said clamp member actuating means includes toggle links coupled between one of each pair of said clamp members and to drive mechanism for actuating said toggle links.

7. The combination according to claim 6 wherein said shear means includes a movable shear block mounted on each side of a strip access slot in said carriage structure, said movable shear blocks respectively cooperating with juxtaposed stationary shear blocks likewise positioned on each side of said access slot, said entry clamp mechanism is tiltable to a position whereat the strip end clamped therebetween is juxtaposed to one of said stationary shear blocks for shearing by the associated movable shearing block, and said delivery clamp mechanism is tiltable to a position whereat a strip end clamped therebetween is juxtaposed to the other of said stationary shear block for shearing by the other of said movable shear blocks.

8. A welding machine for a strip processing line and the like, said machine comprising a movable carriage structure, means for mounting said carriage structure for movement along a path toward and away from the pass line of said processing line, means for moving said carriage along said path, double shear means mounted on said carriage for movement therewith for shearing leading and trailing ends respectively of said strip, and welding means mounted on said carriage for welding juxtaposed ends of said strip when thus sheared, said shear means including a pair of movable shear blocks mounted on either side of a strip access slot in said carriage, said movable shear blocks being movable toward and away from positions of shearing juxtaposition with a pair of stationary shear blocks respectively likewise mounted on either side of said strip access slot.

9. The combination according to claim 5 wherein each of said clamping mechanisms are mounted for movement toward and away from the area generally in the direction of said pass line, and means are provided for so moving each of said clamping mechanisms independently of the other to overlap said juxtaposed ends.

10. The combination according to claim 5 wherein each of said clamping mechanisms are tiltably mounted on eccentric shaft means, and means are provided for independently actuating eccentric portions on said shaft means for moving each of said clamp mechanisms independently toward the other of said clamp mechanisms to overlap said juxtaposed ends.

11. The combination according to claim 10 wherein said eccentric shaft means includes an inner shaft and an outer tubular shaft through which said inner shaft is inserted, said inner shaft having protruding end portions, first path defining means engaging said inner shaft end portions to define a path of movement of said inner shaft toward and away from the other of said clamp mechanisms, said outer shaft having eccentric shaft portions adjacent each end thereof, second path defining means engaging said eccentric portions and defining a path of movement thereof substantially at right angles to the path of movement of said inner shaft ends, and means for angularly displacing said outer shaft to displace said inner shaft and the major proportion of said outer shaft with the exceptions of said eccentric portions along said first-mentioned shaft path.

12. The combination according to claim 11 wherein each of said angular displacing means include a crank actuated by linear motion means, and means are provided for adjusting the linear throw of each said linear motion means to vary the extent of overlappage contributed by the associated one of said clamping mechanisms.

13. The combination according to claim 2 wherein air motors are mounted spacedly within wheel hub portions for rotating said wheels, and means are coupled to the spaces between said hub portions and said air motors for circulation of air for said air motors through said spaces for cooling said wheels.

14. A welding machine for a strip processing line and the like, said machine comprising a movable carriage structure, means for mounting said carriage structure for movement along a path toward and away from the pass line of said processing line, means for moving said carriage along said path, first and second shear means independently mounted on said carriage for movement therewith for shearing leading and trailing ends respectively of said strip, and means for independently actuating said first and said second shear means.

References Cited

UNITED STATES PATENTS

| | | | |
|---|---|---|---|
| 3,298,587 | 1/1967 | Seeloff | 228—5 |
| 3,378,185 | 4/1968 | Wheeler | 228—5 |
| 3,394,857 | 7/1968 | Wheeler | 228—5 |
| 3,198,931 | 8/1965 | Klempay | 228—5 |
| 2,486,592 | 4/1949 | Forssmark | 219—4 |
| 2,957,975 | 10/1960 | Pearson | 219—81 |
| 1,300,603 | 4/1919 | Gravell | 219—81 |
| 3,265,853 | 8/1966 | Taylor | 219—82 |
| 3,119,005 | 1/1964 | Riley | 219—82 |
| 3,021,416 | 2/1962 | Mallett et al. | 219—82 |
| 3,338,498 | 8/1967 | Nelson | 219—82 |

CHARLES T. MOON, Primary Examiner

R. J. CRAIG, Assistant Examiner

U.S. Cl. X.R.

228—4; 219—82; 83—516, 519